United States Patent
Edwards

(10) Patent No.: US 7,559,011 B1
(45) Date of Patent: Jul. 7, 2009

(54) CIRCUIT HAVING A PROGRAMMABLE CIRCUIT AND METHOD OF VALIDATING A BITSTREAM LOADED INTO A PROGRAMMABLE DEVICE

(75) Inventor: Eric E. Edwards, Albuquerque, NM (US)

(73) Assignee: XILINX, Inc., San Jose, CA (US)

( * ) Notice: Subject to any disclaimer, the term of this patent is extended or adjusted under 35 U.S.C. 154(b) by 605 days.

(21) Appl. No.: 11/352,034

(22) Filed: Feb. 10, 2006

(51) Int. Cl.
*G06F 11/00* (2006.01)

(52) U.S. Cl. .................................. 714/811; 714/815
(58) Field of Classification Search .......... 714/811, 714/815
See application file for complete search history.

(56) References Cited

U.S. PATENT DOCUMENTS

| | | | | |
|---|---|---|---|---|
| 4,811,345 A | * | 3/1989 | Johnson | 714/27 |
| 5,008,879 A | * | 4/1991 | Fischer et al. | 370/401 |
| 5,167,020 A | | 11/1992 | Kahn et al. | |
| 5,336,950 A | | 8/1994 | Popli et al. | |
| 5,517,615 A | | 5/1996 | Sefidvash et al. | |
| 5,752,044 A | * | 5/1998 | Crump et al. | 713/323 |
| 5,841,867 A | | 11/1998 | Jacobson et al. | |
| 5,925,140 A | | 7/1999 | Hudson | |
| 6,003,133 A | * | 12/1999 | Moughanni et al. | 726/4 |
| 6,023,736 A | * | 2/2000 | Lambeth et al. | 710/10 |
| 6,049,874 A | | 4/2000 | McClain et al. | |
| 6,052,815 A | | 4/2000 | Zook | |
| 6,237,124 B1 | | 5/2001 | Plants | |
| 6,415,394 B1 | * | 7/2002 | Fruehling et al. | 714/30 |
| 6,560,394 B1 | | 7/2002 | Fruehling et al. | |
| 6,466,049 B1 | | 10/2002 | Diba et al. | |
| 6,560,743 B2 | | 5/2003 | Plants | |
| 6,625,688 B1 | | 9/2003 | Fruehling et al. | |

(Continued)

OTHER PUBLICATIONS

U.S. Appl. No. 10/741,689, filed Dec. 18, 2003, Edwards et al.

(Continued)

*Primary Examiner*—Stephen M Baker
(74) *Attorney, Agent, or Firm*—John J. King; Thomas George

(57) ABSTRACT

A method of validating a bitstream loaded into a circuit having a programmable circuit is disclosed. According to one embodiment, the method comprises steps of loading a configuration bitstream comprising an error detection command at an input of the circuit; decoding the bitstream; providing a signal indicating that an error detection should be performed to a state machine when an error detection command has been decoded; and restarting the loading of the configuration bitstream if the signal has not been received. A device having a programmable circuit is also disclosed.

20 Claims, 5 Drawing Sheets

U.S. PATENT DOCUMENTS

| | | | |
|---|---|---|---|
| 6,732,308 B1 * | 5/2004 | Leung | 714/724 |
| 6,748,456 B1 | 6/2004 | Stanton et al. | |
| 6,772,387 B1 | 8/2004 | Plants | |
| 6,968,478 B1 | 11/2005 | Edwards et al. | |
| 7,000,161 B1 * | 2/2006 | Allen et al. | 714/725 |
| 7,003,775 B2 * | 2/2006 | Lacombe et al. | 719/313 |
| 7,007,203 B2 | 2/2006 | Gorday et al. | |
| 7,032,158 B2 * | 4/2006 | Alvarez et al. | 714/763 |
| 7,225,373 B1 | 5/2007 | Edwards et al. | |
| 7,236,783 B2 * | 6/2007 | Gould | 455/435.1 |
| 7,359,404 B1 * | 4/2008 | Allan | 370/469 |
| 7,453,886 B1 * | 11/2008 | Allan | 370/395.5 |
| 7,457,856 B2 * | 11/2008 | Soejima et al. | 709/221 |
| 2003/0196086 A1 | 10/2003 | Murakami et al. | |
| 2004/0003332 A1 | 1/2004 | Kim et al. | |
| 2004/0133832 A1 | 7/2004 | Williams et al. | |

OTHER PUBLICATIONS

Gadiel Seroussi; "Table of Low-Weight Binary Irreducible Polynomials"; HPL-98-135; Aug. 1998; Hewlett Packard, Computer Systems Laboratory; Copyright Hewlett-Packard Company 1998; pp. 1-15.

* cited by examiner

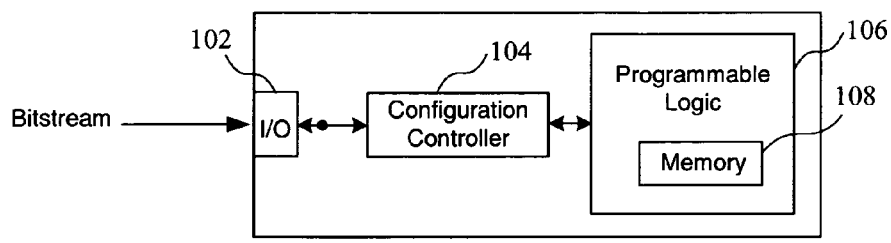
FIG. 1
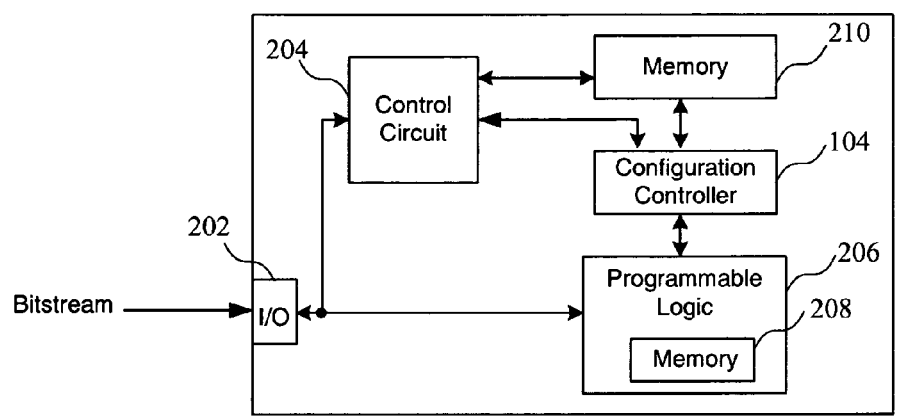
FIG. 2
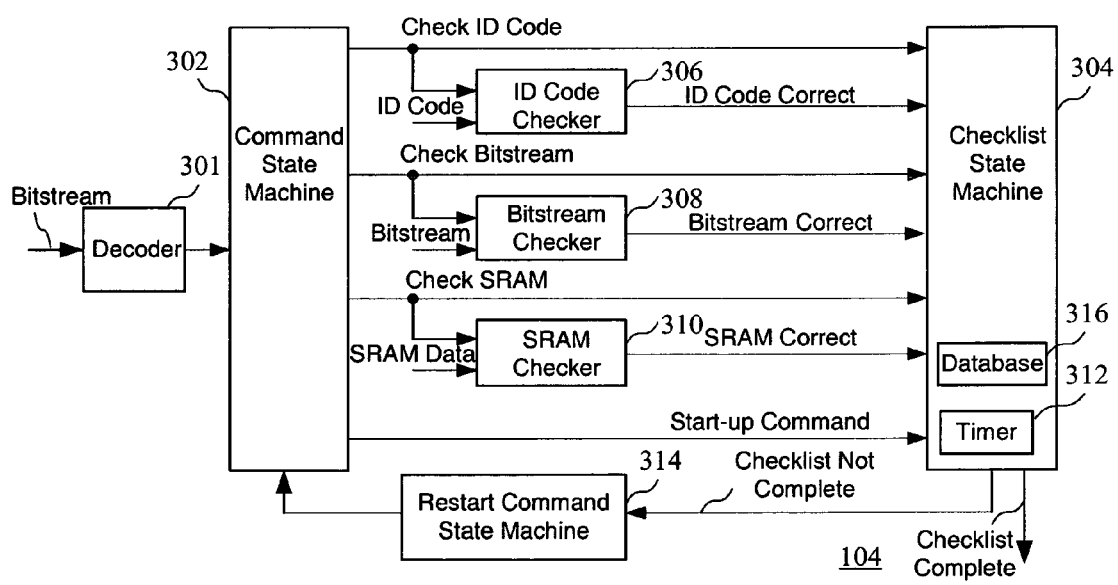
FIG. 3
FIG. 6

CIRCUIT HAVING A PROGRAMMABLE CIRCUIT AND METHOD OF VALIDATING A BITSTREAM LOADED INTO A PROGRAMMABLE DEVICE

FIELD OF THE INVENTION

The present invention relates generally to circuits having programmable logic, and in particular, to a method of validating a bitstream loaded into a circuit having programmable logic.

BACKGROUND OF THE INVENTION

A programmable logic device (PLD) is designed to be user-programmable so that users may implement logic designs of their choices. One type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. In some CPLDs, configuration data is stored on-chip in non-volatile memory, then downloaded to volatile memory as part of an initial configuration sequence.

Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell.

PLDs also have different "modes" depending on the operations being performed on them. A specific protocol allows a programmable logic device to enter into the appropriate mode. Typical PLDs have internal blocks of configuration memory which specify how each of the programmable cells will emulate the user's logic. During a "program" mode, a configuration bitstream is provided to non-volatile memory, such as a read-only memory (ROM) (e.g. a programmable ROM (PROM), an erasable PROM (EPROM), an electrically erasable PROM (EEPROM)) either external or internal to the programmable logic device. Each address is typically accessed by specifying its row and column addresses. During system power up of a "startup" mode, the configuration bits are successively loaded from the non-volatile memory into static random access memory (SRAM) configuration latches of a configuration logic block. At the end of this start-up phase, the PLD is now specialized to the user's design, and the PLD enters into "user" mode as part of its normal operation.

Currently, the FPGA configuration is checked with a cyclic redudancy check (CRC) register. As configuration data is loaded into the FPGA, that data is accumulated into a CRC register, which in turn generates a "signature" of the data. At any point in the incoming configuration bitstream, typically near the end, the expected signature can be loaded into the CRC and compared with the generated signature to determine whether they match. If they do not, then the configuration process will halt, and a signal will be output to indicate an error. Also, an identification (ID) code of a device is shifted in as part of the configuration bitstream. It is compared with a hard-wired ID code to see if the ID code of the device and the incoming bitstream match. If they do not, then the configuration process will halt, and an error signal will be output. If either the ID code or the CRC is incorrect, a board designer must interpret the error and manually issue a configuration reset and restart the configuration process.

However, the CRC and ID code checking process of a conventional device has a number of shortcomings. For example, if a CRC error or some other error associated with the incoming data is detected in a conventional device, the conventional device halts the configuration process. Further, if the CRC check command is not issued, then the CRC is not checked at the end of the bitstream. Therefore, a conventional device will startup anyway, regardless of whether there are errors in the bitstream. There is also a problem if the CRC check command itself is garbled. In that case, then the CRC is not checked at the end of the bitstream, and the FPGA will startup even if there are errors in the bitstream. Further, if there are any commands in the bitstream (e.g. a Desynch command, also commonly called a start-up command) after the CRC check command that is garbled, then the device may not startup even if the CRC was checked and it passed the check. Finally, the SRAM of a conventional device should be checked to determine if it was loaded correctly.

Accordingly, there is a need for an improved circuit for and method of validating a bitstream loaded into a programmable logic device.

SUMMARY OF THE INVENTION

A method of validating a bitstream loaded into a circuit having programmable logic is disclosed. The method comprises steps of loading a configuration bitstream comprising an error detection command at an input of the circuit; decoding the bitstream; providing a signal indicating that an error detection should be performed to a state machine when an error detection command has been decoded; and restarting the configuration process if the signal has not been received. The method may further comprise a step of coupling an error detection result to the state machine. The method may further include a step of coupling other signals indicating that a comparison should be performed, such as a comparison of an ID code of the bitstream with a stored ID code or a comparison of data read back from a memory with predetermined data known to be correct. Finally, the method may further comprise a step of determining whether a start command is received within a predetermined period of time.

According to an alternate embodiment, a method of validating a bitstream loaded into a circuit having programmable logic comprises steps of providing a state machine for enabling the loading of a configuration bitstream; loading the configuration bitstream having an error detection command; decoding the error detection command of the bitstream; coupling a signal indicating that an error detection code has been decoded to the state machine; and coupling an error detection result to the state machine. The method may further comprise a step of restarting the step of loading a configuration bitstream if a required signal has not been received or if a timer has expired before a required signal has been received.

A device having programmable logic is also disclosed. The device comprises an input for receiving a configuration bitstream having an error detection command; a decoding circuit coupled to receive the bitstream, the decoding circuit outputting a signal indicating that an error detection command has been decoded; and a state machine coupled to receive the signal indicating that an error detection command has been decoded, wherein the state machine generates a signal to restart the loading of configuration data if the signal indicating that an error detection command has been decoded is not received by the state machine. The device may further comprise a timer, wherein the state machine generates a signal indicating that configuration data should be reloaded if a predetermined signal has not been received before the timer expires.

BRIEF DESCRIPTION OF THE DRAWINGS

FIG. 1 is a block diagram of a circuit for validating a bitstream according to an embodiment the present invention;

FIG. 2 is a block diagram of a circuit for validating a bitstream and having an internal memory according to an embodiment of the present invention;

FIG. 3 is a block diagram of a configuration controller according to an embodiment of the present invention;

FIG. 6 is a diagram of a frame having an error detection command according to an embodiment of the present invention;

DETAILED DESCRIPTION OF THE DRAWINGS

Figure 4:
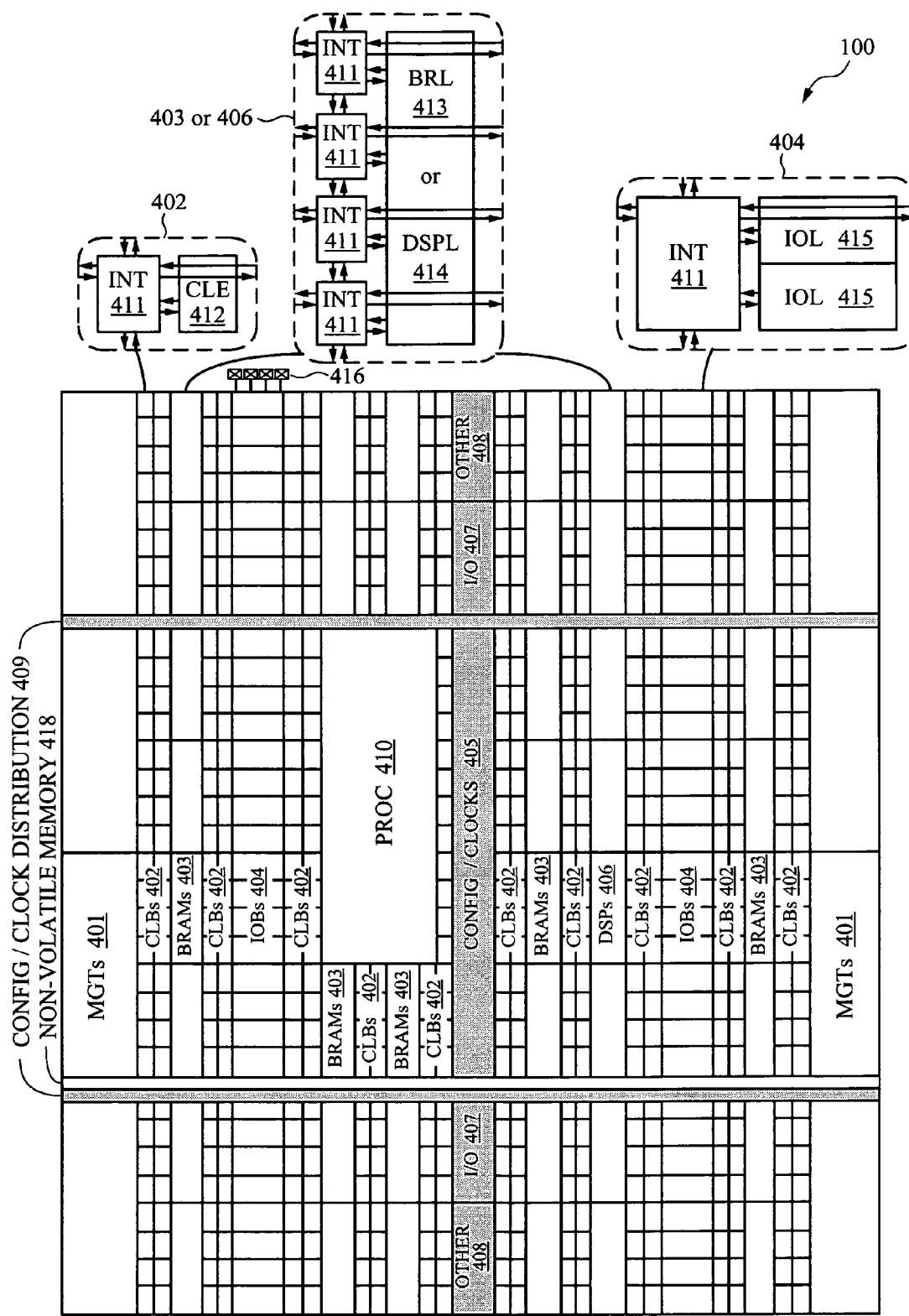
FIG. 4 is a block diagram of a field programmable logic device incorporating the circuits of FIGS. 1-3 according to an embodiment of the present invention.

Turning first to FIG. 1, a block diagram of a circuit 100 for validating a bitstream according to an embodiment the present invention is shown. In particular, the circuit 100 comprises an input/output port 102 receiving an input bitstream comprising configuration data and other control data as will be described in more detail in reference to FIG. 6. The bitstream is coupled to a configuration controller 104, which will be described in more detail in reference to FIG. 3. The circuit 100 further comprises a programmable logic circuit 106 having a memory 108. The programmable logic circuit 106 may be provided in a number of programmable logic blocks, each having configuration memory, such as a RAM. Although a single programmable logic circuit 106 is shown, it should be understood that the programmable logic circuit 106 may comprise a plurality of programmable logic circuits, as will be in more detail in reference to FIGS. 4 and 5. Similarly, although a single configuration memory 108 is shown, a given programmable logic circuit may comprise a plurality of memory blocks having memory cells. The programmable logic circuit comprises gates which are configurable by a user of the circuit to implement a circuit design of the user. Also, configuration memory 108 may be either volatile memory or non-volatile memory, or the programmable logic circuit may include both volatile and non-volatile memory, as will be described in more detail below.

Turning now to FIG. 2, a block diagram of a circuit 200 for validating a bitstream and having an internal memory according to an embodiment of the present invention is shown. Unlike the embodiment of FIG. 1 in which configuration data is loaded directing into configuration memory of a programmable logic device, the configuration data is loaded into a non-volatile memory which is then used for loading the configuration memory. The circuit 200 preferably comprises an input/output port 202 coupled to a control circuit 204 and a programmable logic circuit 206. Configuration memory 208 associated with the configurable logic circuit 206 comprises memory cells for configuring the programmable logic based upon the configuration data. Finally, the circuit may comprise a memory 210, external to the programmable logic circuit, which may either be volatile or non-volatile memory, for initially receiving and storing configuration data. The circuits of FIGS. 1 and 2 may be any device having programmable logic, such as an FPGA or CPLD described above, or any integrated circuit having programmable logic, such as an application-specific integrated circuit (ASIC) having a portion of circuits which are programmable.

The configuration controller of FIGS. 1 and 2 enable a plurality of checks that are performed on the configuration data, and checks both data incoming to the PLD and data which has been loaded into the SRAM internal to the PLD. In particular, the configuration controller ensures that the checks were performed and that they passed. Instead of halting configuration if an error is detected, the configuration controller preferably restarts the entire configuration process any number of times to successfully load the configuration data. The configuration controller can output status bits indicating the number and types of failures that have been detected. The configuration controller preferably contains a loadable counter that will wait a certain amount of time to ensure that the final proper commands are received from the bitstream, which may be outside any other checks. If that counter times out without having received the proper command words, then the configuration controller may restart the entire configuration process.

Turning now to FIG. 3, a block diagram of the configuration controller 104 according to an embodiment of the present invention is shown. The configuration controller comprises a decoder 301 for decoding the bitstream and plurality of individual state machines coupled between a command state machine 302 and a checklist state machine 304. The command state machine 302 generates signals to ensure that the appropriate checks are both made and passed during the configuration of a circuit having programmable logic. That is, the Command State Machine generates check requests to circuits for making checks, and these circuits generate check results. Both the check requests and the check results are coupled to the Checklist State Machine 304. In particular, an ID Code Checker 306 is coupled to receive a "Check ID Code" signal indicating that the ID Code should be checked. For example, the Check ID Code may be generated in response to the decoding of a Check ID Code Command of the bitstream by the configuration controller. The ID Code checker 306 also receives the ID Code, and generates an "ID Code Correct" signal indicating whether the ID Code is correct based upon a comparison of the received ID Code of the bitstream and an ID code for the device which is stored in a memory of the device. The "Check ID Code" signal may be a binary signal indicating a request for a check, and the "ID Code Correct" signal may be a binary signal indicating whether the check was correct. Accordingly, the Checklist State Machine not only receives a signal indicating that the ID Code Checker has been instructed to check the ID Code, but also a determination of whether the ID Code was correct or not correct. Similarly, a Bitstream Checker 308 receives a Check Bitstream signal from the Command State Machine 302 to check an incoming bitstream, such as an incoming bitstream from a PROM. For example, a Check Bitstream signal may be generated in response to the decoding of an Error Detection Command of the bitstream. The Error Detection Command may be a command for instructing an error detection circuit or error correction circuit, such as a CRC circuit or a multiple input signature register (MISR) circuit, to determine whether an error has occurred in loading the configuration bitstream. An SRAM Checker 310 also receives a Check SRAM signal requesting to check the data stored in an SRAM by reading back the data. The SRAM data read back from the memory is compared to known valid data which should be stored in the SRAM. Finally, the start-up command is coupled to the Checklist State Machine. A timer 312 determines whether any of the signals (which should have been received by the Checklist State Machine) are not received within a predetermined amount of time. For example, the timer 312 may determine if any of the required signals has not been received within a certain amount of time, or whether a final signal, such as a start-up signal, has not been received within a given amount of time. If a required signal is not received in a given period of time, the timer will send a signal to a Restart Command State Machine 314 indicating that the checklist was not complete, allowing the configuration controller to restart the loading of the configuration data. If the checklist is complete, the programmable logic device operates as normal in a user mode.

Unlike conventional devices which respond to a signal if it is received, or generate certain signals, the configuration controller of an embodiment of the present invention ensures that signals which are or should be received are properly received, and ensures that signals such as check results which should be generated are properly generated in order to ensure that the configuration data is properly loaded. The state machine is preferably internal to a programmable logic device and runs simultaneously with the configuration of the programmable logic device. The circuits for enabling the various checks applied above may comprise, for example, comparison circuits implemented in programmable logic, which will be described in more detail below. A number of checks are performed on the incoming bitstream or on the SRAM after it has been written to make sure that the configuration is correct. The state machine will keep track of all of the checks, and if any of the checks are not made, then it will automatically restart the configuration process. For example, if a CRC error or some other error associated with the incoming data is detected, then the state machine can reset the programmable logic device and restart the configuration process rather than halting. This can be done any number of times, to ensure that the correct data will be loaded into the FPGA. Similarly, if the CRC check command which is expected to be issued is not issued, then the state machine will determine that the data in the bitstream was not correctly loaded. That is, unlike conventional devices which merely respond to a command, such as an error detection command, the state machine of the circuit of FIG. 3 ensures that a command which should be received is received as expected, and then determines whether an error is detected.

Also, the state machine determines whether a load threshold has been received. For example, if any expected command of the bitstream is not received within a given amount of time or within a given number of bits, the checklist state machine will restart the configuration process. Similarly, if the CRC check command itself is garbled, then the state machine would determine that the CRC check command was not properly received, and the programmable logic device would not be started, avoiding any errors in the bitstream. That is, the CRC check command would not be properly decoded to generate the Check Bitstream signal. The state machine would also determine whether other commands in the bitstream, such as a start-up command, are correctly received. If the start-up is not correctly received, but should have been received after the CRC check command was checked and passed, the state machine will determine that there is an error. Finally, the state machine will preferably check to determine whether the data in the SRAM is properly loaded. An example of a circuit for determining whether the data was correctly loaded is described in Data Transfer Validation System, application Ser. No. 10/741,689, filed by the Assignee of the present application on Dec. 18, 2003, the entire application of which is incorporated by reference.

The state machine also keeps track of all configuration bitstream checks. If anything is either not checked or fails the check, then the checklist state machine will preferably issue a global reset signal that will restart the entire configuration process. According to one embodiment, the state machine will check to see (i) whether or not all the required checks are performed, (ii) whether or not all the required checks passed or failed, and (iii) whether or not any final commands are issued within a given amount of time. The timer 312 of the state machine or some other counter accessible by the state machine preferably keeps track of time for final commands to be loadable and/or readable. A database 316 is preferably also maintained to keep a record of the number of failures of each type of check, for example. This information is preferably output to a readable status register and can be optionally disabled by a bit or a bit-code. If any of the required checks are not performed or if they fail, then the checklist state machine will preferably output a signal to restart the entire configuration process. The number of times that configuration will be attempted can be set by the user, and may be variable and finite, or infinite. The state machine may also output an "Checklist Complete" status bit, signaling that all required checks were performed, they were correct, and the device started up as expected. A CD ROM having Verilog code for implementing the configuration controller 104 using a CRC according to one aspect of the present invention is attached as a part of this application and is herein incorporated by reference. The code reproduced in this patent document contains material subject to copyright protection. The copyright owner of that material has no objection to the facsimile reproduction of the patent document or the patent disclosure, as it appears in the Patent and Trademark Office patent files or records, but otherwise reserves all copyright rights.

Turning now to FIG. 4, a block diagram of a field programmable logic device incorporating the circuits of FIGS. 1-3 according to an embodiment of the present invention is shown. That is, the various elements of FIGS. 1-3 may be implemented in related elements of the circuit of FIG. 4. Advanced FPGAs may include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-todigital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 may include a configurable logic element (CLE 412) that may be programmed to implement user logic plus a single programmable interconnect element (INT 411). The programmable logic circuits of FIGS. 1 and 2 may be implemented in a CLB. The configuration controller of FIGS. 1 and 2 may be implemented in various portions, including both a CLB as well as the processor 410. For example, the state machine could be run on the processor, as is well known in the art. A BRAM 403 may include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) may also be used. A DSP tile 406 may include a DSP logic element (DSPL 414) in addition to an appropriate number of programmable interconnect elements. An IOB 404 may include, for example, two instances of an input/output logic element (IOL 415) in addition to one instance of the programmable interconnect element (INT 411). As will be clear to those of skill in the art, the actual I/O pads 416 connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA. Some FPGAs utilizing the architecture illustrated in FIG. 4 include additional logic blocks that disrupt the regular columnar structure making up a large part of the FPGA. The additional logic blocks may be programmable blocks and/or dedicated logic. For example, the processor block PROC 410 shown in FIG. 4 spans several columns of CLBs and BRAMs. Finally, a non-volatile memory 418 may be employed for on-chip storage of configuration data which is used to configure the configuration logic blocks or other programmable tiles as described above.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of programmable logic device, having configuration memory.

Figure 5:
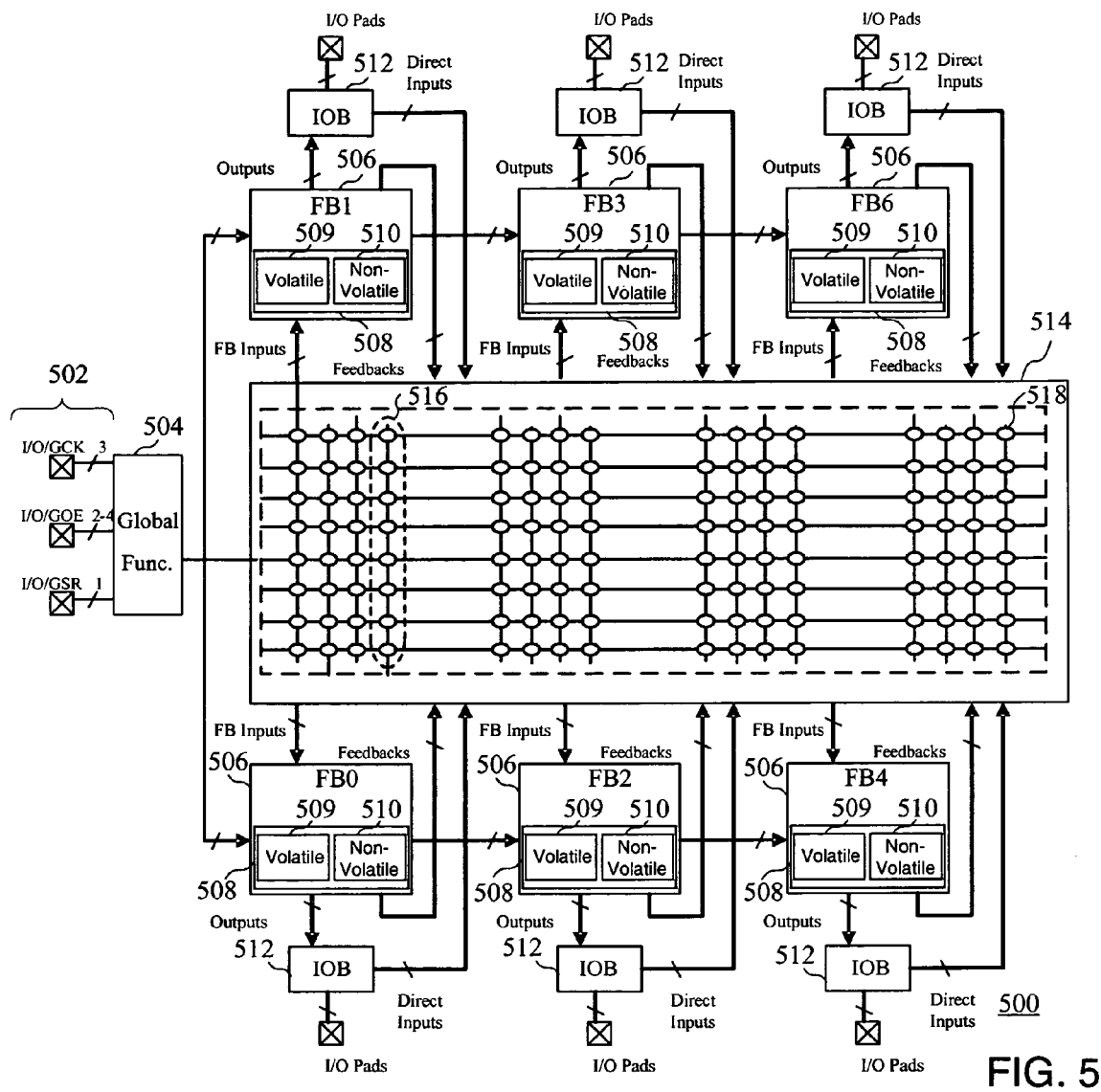
FIG. 5 is a block diagram of a complex programmable logic device incorporating the circuits of FIGS. 1-3 according to an embodiment of the present invention.

Turning now to FIG. 5, a block diagram of a complex programmable logic device incorporating the circuits of FIGS. 1-3 according to an embodiment of the present invention is shown. The CPLD comprises a plurality of input/output pads 502 coupled to a global functions block 504, which may provide clock signals to the remaining portions of the CPLD and enable routing of data to and from the internal circuits of the CPLD. The CPLD further comprises a plurality of function blocks 506 (FB1 through FB6), which comprise blocks of programmable logic. Each function block of the CPLD typically includes a two-level AND/OR structure similar to those used in Programmable Logic Arrays (PLAs) and Programmable Array Logic (PAL) devices, as is well known in the art. Each of the function blocks preferably comprises configuration memory 508, which may comprise volatile memory 509 and/or non-volatile memory 510. Function blocks which are unused will therefore comprise configuration memory which is unused.

The function blocks are connected together and to input/output blocks 512 by a programmable interconnection array 514. The programmable interconnection array includes many multiplexer circuits 516, each including several PIPs 518. In each multiplexer circuit 516, only one PIP 518 is enabled. The enabled PIP selects one of the many input signals provided to the interconnection array, and the selected input signal is provided as the output signal from the multiplexer circuit 516. The circuits of FIGS. 1-3 may also be implemented in elements of the CPLD, as described above. Further information on CPLDs may be found, for example, in U.S. Pat. No. 6,466,049 B1 by Sholeh Diba et al., issued Oct. 15, 2002, which is hereby incorporated herein by reference.

Figure 7:
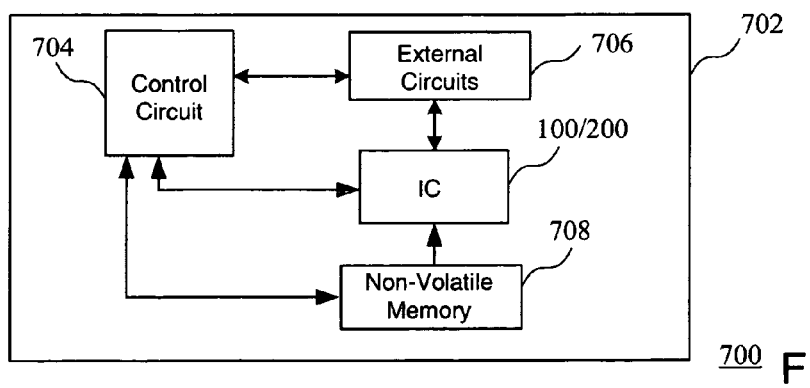
FIG. 7 is a block diagram of a circuit incorporating the integrated circuits of FIG. 1 or 2 according to an embodiment of the present invention.

Turning now to FIG. 7, a block diagram of a circuit incorporating the integrated circuits of FIG. 1 or 2 according to an embodiment of the present invention is shown. The circuit comprises a circuit board 702 having a control circuit 704. The control circuit 704 may be, for example, a microprocessor or other integrated circuit for controlling external circuits 706, integrated circuit 100 or 200, and a non-volatile memory 708. Depending upon the type of device employing programmable logic which is used, the control circuit 704 may be implemented on the programmable logic device. Accordingly, an external circuit may also be used to determine whether a bitstream is properly loaded. That is, the control circuit may send control signals to an receive status signals from the integrated circuit to detect whether the bitstream is properly received as described above.

Figure 8:
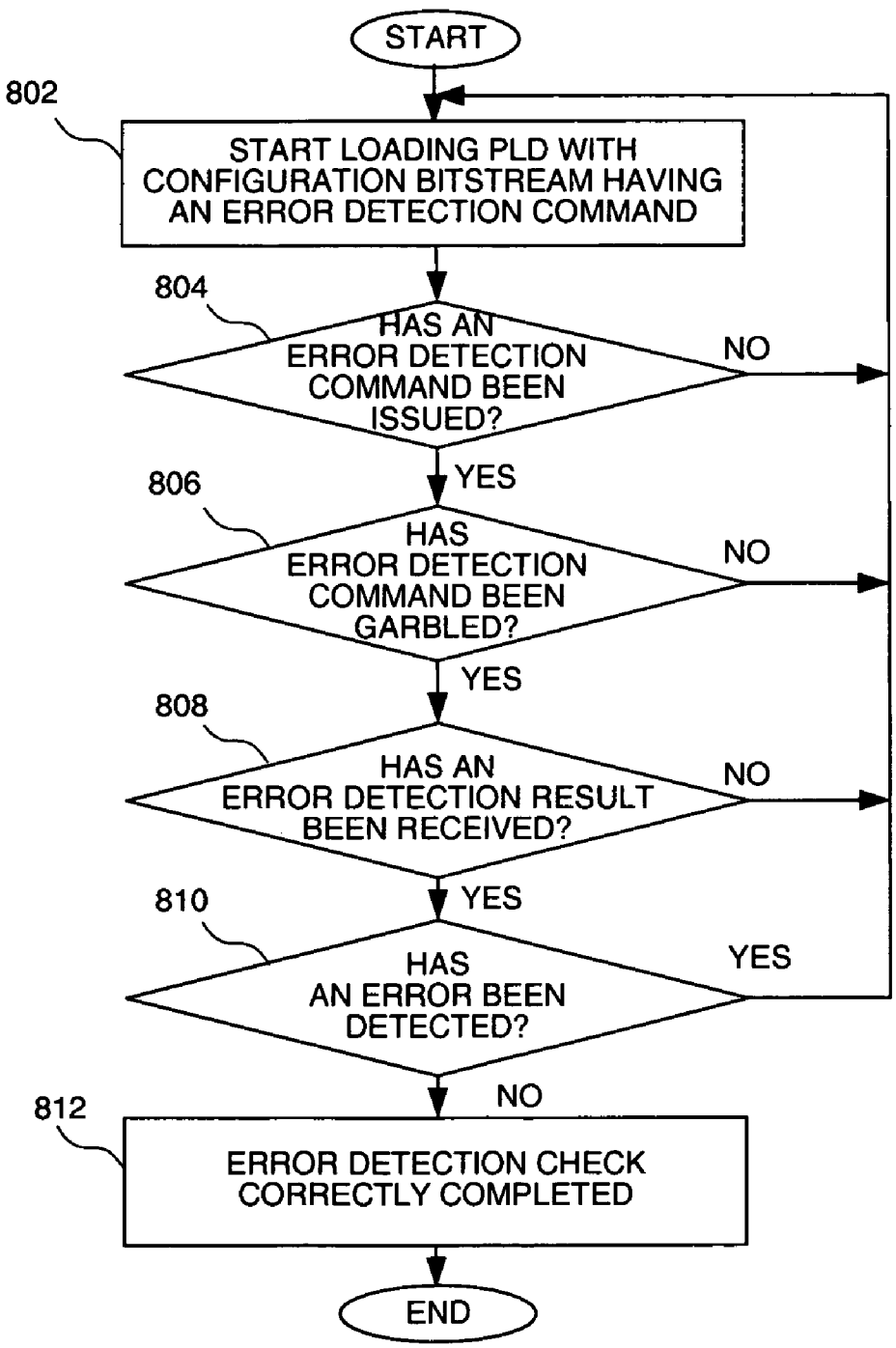
FIG. 8 is a flow chart showing a method of validating a bitstream loaded into a programmable logic device according to an embodiment of the present invention.

Turning now to FIG. 8, a flow chart shows a method of validating a bitstream loaded into a programmable logic device according to an embodiment of the present invention. In particular, the programmable logic device is loaded with a configuration bitstream having, among other signals, an error detection command at a step 802. It is then determined whether the error detection command has been issued at a step 804. It is also determined whether an error detection command has been garbled at a step 806. Assuming that an error detection result has been received at a step 808, it is then determined whether an error has been detected, as indicated by the error detection results, at a step 810. In the event that an error detection signal has not been properly received or executed, or an error has been detected, the configuration process is restarted. Finally, it is determined whether the error detection check has correctly been completed at a step 812. The method of FIG. 8, as well as the method described in the following FIG. 9, may be implemented according to any of the circuits described above, or some other suitable circuit.

Figure 9:
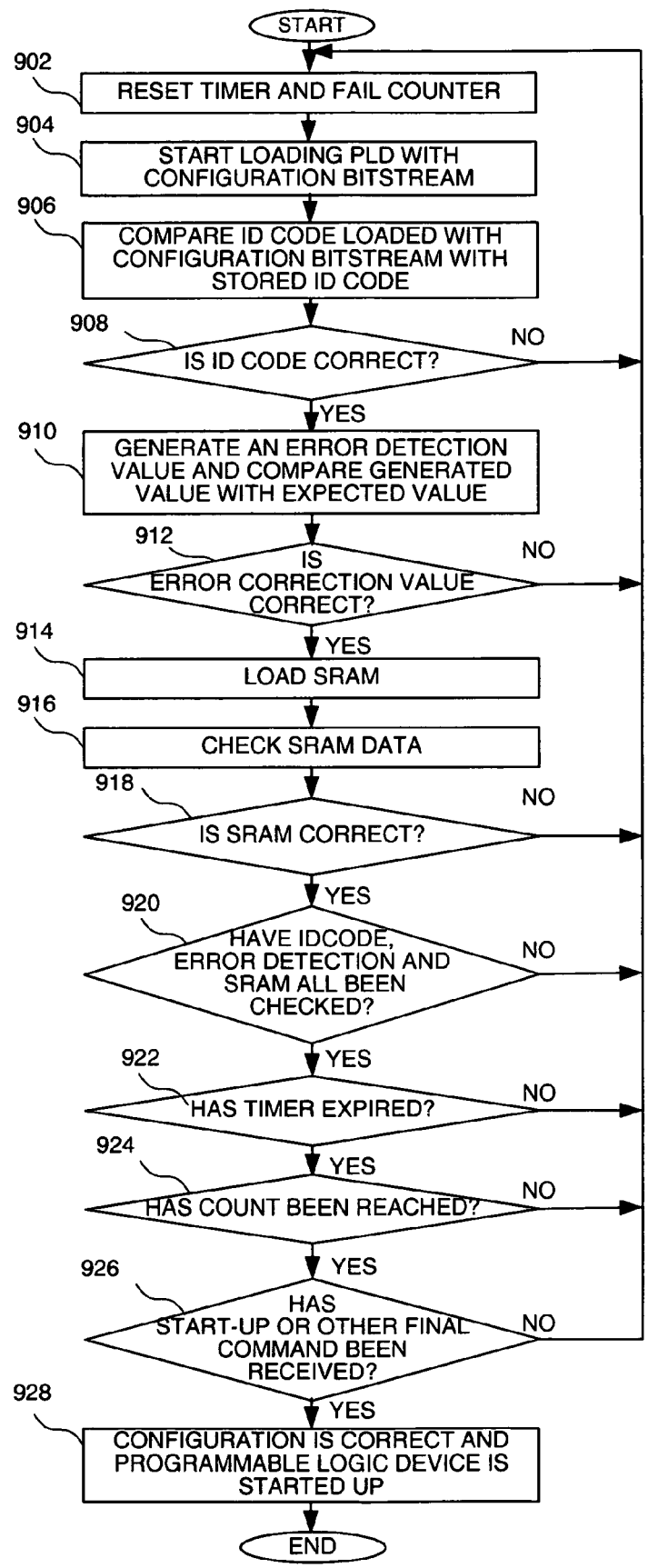
FIG. 9 is a flow chart showing a method of validating a bitstream loaded into a programmable logic device according to an alternate embodiment the present invention.

Turning now to FIG. 9, a flow chart shows a method of validating a bitstream loaded into a programmable logic device according to an alternate embodiment the present invention. In particular, a timer and fail counter is reset at a step 902. The programmable logic device is then loaded with a configuration bitstream having a stored ID code, an error detection command, and a start-up signal at a step 904. An ID code of the bitstream is compared with a stored ID code at a step 906. It is then determined whether the ID code is correct at a step 908. An error detection value is then generated and compared to an expected value at a step 910. It is then determined whether an error detection value is correct at a step 912. If so, the SRAM is completely loaded at a step 914 and checked at a step 916 by re-reading the data. It is then determined whether the data loaded in the SRAM is correct at a step 918. If so, it is then determined whether the ID code, the detection code and the SRAM have all been checked at a step 920. That is, the state machine determines whether all of the appropriate checks have been made. While certain checks are described, not all of the specific checks described are required to be made as a part of the checking process, while other checks could also be made according to the embodiment of FIG. 9.

If all of the checks have been successfully made, it may then be determined whether a timer has expired at a step 922. That is, if a certain number of clock cycles pass without having received a predetermined signal, such as a start-up signal which would be expected to be received within a certain number of bits or clock cycles. It may also be determined whether a bit count has been reached at a step 924. Finally, it may then be determined whether a start-up signal or other final command had been received at a step 926. If all of the checks have been completed, it is determined that the configuration bitstream is correctly stored in the device and the device is started at a step 928.

It can therefore be appreciated that the new and novel circuit for and method of validating a bitstream loaded into a programmable logic device has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of validating a bitstream loaded into a circuit having a programmable circuit, said method comprising the steps of:
    loading a configuration bitstream comprising an error detection command at an input of said circuit;
    decoding said bitstream;
    providing a signal indicating that an error detection should be performed to a state machine when an error detection command has been decoded; and
    restarting said loading of said configuration bitstream if said signal indicating that an error detection should be performed has not been received by said state machine.

2. The method of claim 1 further comprising a step of determining whether a start-up command is received within a predetermined period of time.

3. The method of claim 1 further comprising a step of coupling an error detection result to said state machine.

4. The method of claim 1 further comprising a step of coupling a signal indicating that an ID Code comparison should be performed to said state machine.

5. The method of claim 4 further comprising a step of coupling a result of said ID Code comparison to said state machine.

6. The method of claim 1 further comprising a step of coupling a signal indicating that data stored in a memory should be read back to said state machine.

7. The method of claim 6 further comprising a step of coupling a result of a comparison of data read back from said memory with predetermined data to said state machine.

8. A method of validating a bitstream loaded into a circuit having a programmable circuit, said method comprising the steps of:
    providing a first state machine for enabling the loading of a configuration bitstream having an error detection command;
    loading said configuration bitstream having said error detection command;
    decoding said error detection command of said configuration bitstream;
    coupling a signal indicating that said error detection command has been decoded to a second state machine; and
    coupling an error detection result to said second state machine.

9. The method of claim 8 further comprising a step of restarting said step of loading a configuration bitstream if said signal indicating that said error detection command has been decoded is not been received.

10. The method of claim 8 further comprising a step of coupling a check request signal to a circuit enabling comparing an ID code of said bitstream with an ID code for a device having said programmable circuit.

11. The method of claim 8 further comprising a step of coupling a check request signal to a circuit enabling reading back data from a memory of a device having said programmable circuit.

12. The method of claim 8 further comprising a step of determining whether a timer has expired during said step of loading said configuration bitstream before said error detection result has been received.

13. The method of claim 8 further comprising a step of determining whether a timer has expired during said step of loading said configuration bitstream before a start-up command has been received.

14. The method of claim 13 further comprising a step of restarting said step of loading said configuration bitstream if said start-up command has not been received before said timer has expired.

15. A device having a programmable circuit, said device comprising:
    an input for receiving a configuration bitstream having an error detection command;
    a decoding circuit coupled to receive said bitstream, said decoding circuit generating a signal indicating that an error detection command has been decoded; and
    a state machine coupled to receive said signal indicating that an error detection command has been decoded, wherein said state machine generates a signal to reload said configuration bitstream if said signal indicating that an error detection command has been decoded is not received by said state machine.

16. The device of claim 15 further comprising a timer, wherein said state machine generates a signal indicating that said configuration bitstream should be reloaded if said signal indicating that an error detection command has been decoded is not received within a predetermined period of time.

17. The device of claim 15 wherein said decoding circuit generates a signal indicating that an ID code should be checked.

18. The device of claim 15 wherein said decoding circuit generates a signal indicating that data stored in a memory of said device should be read back.

19. The device of claim 15 wherein said decoding circuit generates a signal indicating that a start-up command has been decoded.

20. The device of claim 19 further comprising a timer, wherein said state machine generates a signal indicating that configuration data should be reloaded if said signal indicating that a start-up command has been decoded is not received within a predetermined period of time.

* * * * *